United States Patent
Sugawara et al.

(10) Patent No.: US 12,012,112 B2
(45) Date of Patent: Jun. 18, 2024

(54) VEHICLE CONTROL SYSTEM

(71) Applicant: HITACHI ASTEMO, LTD., Hitachinaka (JP)

(72) Inventors: Toshiharu Sugawara, Tokyo (JP); Ryoh Inaba, Tokyo (JP); Hidehiro Toyoda, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 434 days.

(21) Appl. No.: 17/283,144

(22) PCT Filed: Sep. 20, 2019

(86) PCT No.: PCT/JP2019/036913
§ 371 (c)(1),
(2) Date: Apr. 6, 2021

(87) PCT Pub. No.: WO2020/075477
PCT Pub. Date: Apr. 16, 2020

(65) Prior Publication Data
US 2021/0387632 A1 Dec. 16, 2021

(30) Foreign Application Priority Data

Oct. 9, 2018 (JP) ................................ 2018-190793

(51) Int. Cl.
*B60W 50/038* (2012.01)
*B60W 30/10* (2006.01)
*B60W 50/14* (2020.01)

(52) U.S. Cl.
CPC .......... *B60W 50/038* (2013.01); *B60W 30/10* (2013.01); *B60W 50/14* (2013.01)

(58) Field of Classification Search
CPC .... B60W 50/038; B60W 30/10; B60W 50/14; B60W 30/18159; B60W 30/18163;
(Continued)

(56) References Cited

U.S. PATENT DOCUMENTS

2018/0257662 A1 9/2018 Ishigooka et al.
2018/0267537 A1 9/2018 Kroop et al.
(Continued)

FOREIGN PATENT DOCUMENTS

| JP | 2017-81290 A | 5/2017 |
| JP | 2017-157067 A | 9/2017 |
| JP | 6381835 B1 | 8/2018 |

OTHER PUBLICATIONS

International Search Report, PCT/JP2019/036913, Dec. 17, 2019 (2 pages).
(Continued)

*Primary Examiner* — Jason Holloway
*Assistant Examiner* — Madison B Emmett
(74) *Attorney, Agent, or Firm* — Volpe Koenig

(57) ABSTRACT

A vehicle control system capable of ensuring safety at a low cost even when a control device fails, includes a first control device that implements at least two automatic driving-related functions based on information from external sensors and/or information from a map database, a second control device that implements fewer automatic driving-related functions than the first control device based on the information from the sensors and/or the map database, and a vehicle motion control device that automatically controls a driving state of a host vehicle based on a function planned by the first or second control device including: a backup determination unit that determines whether the future function planned by the first or second control device is backed up by the second control device; and an interface that notifies a driver that system responsibility is switched to the driver, when the backup is not available.

12 Claims, 15 Drawing Sheets

(58) Field of Classification Search
CPC ....... B60W 50/023; B60W 2050/0292; B60W 2050/146; B60W 60/0053; B60W 60/0027; B60W 50/02
See application file for complete search history.

(56) References Cited

U.S. PATENT DOCUMENTS

| | | | |
|---|---|---|---|
| 2018/0292833 A1* | 10/2018 | You | B60W 50/14 |
| 2018/0370540 A1* | 12/2018 | Yousuf | G06F 11/1487 |
| 2020/0290641 A1 | 9/2020 | Kawakami | |

OTHER PUBLICATIONS

International Search Report, PCT/JP2019/036913, Dec. 17, 2019 (3 pages).

* cited by examiner

FIG. 4
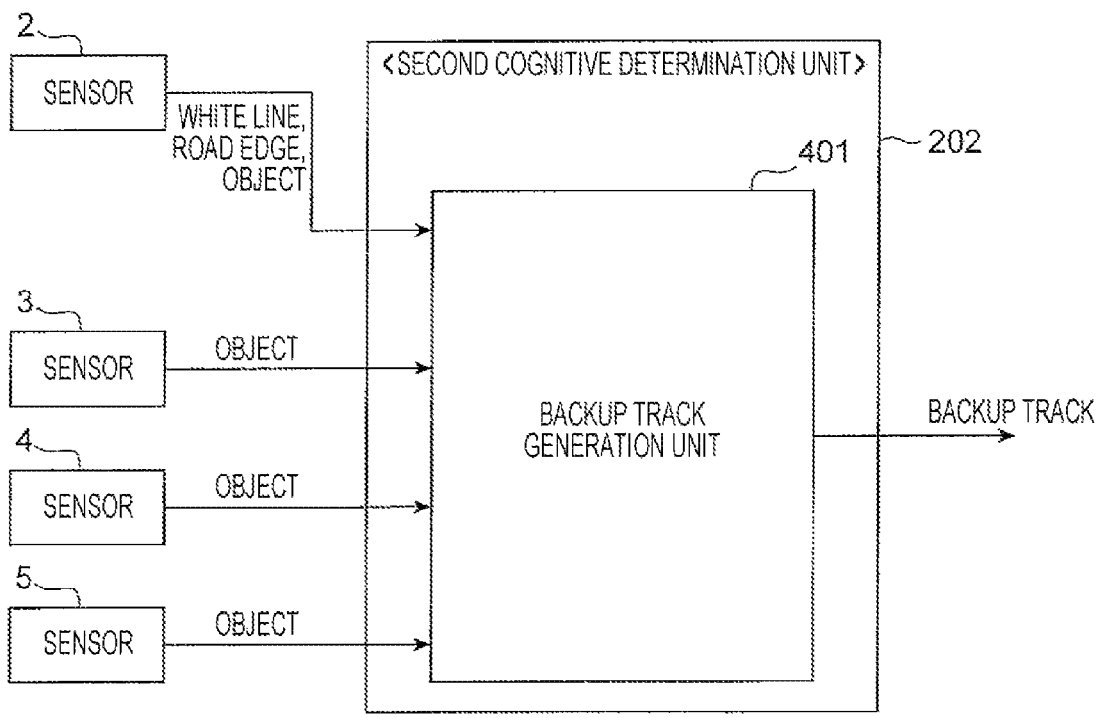
FIG. 5
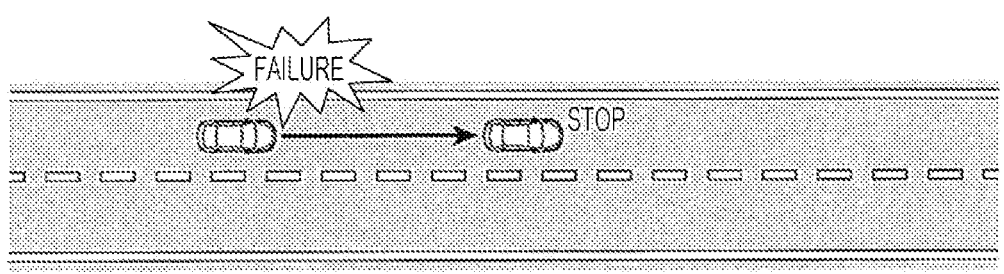
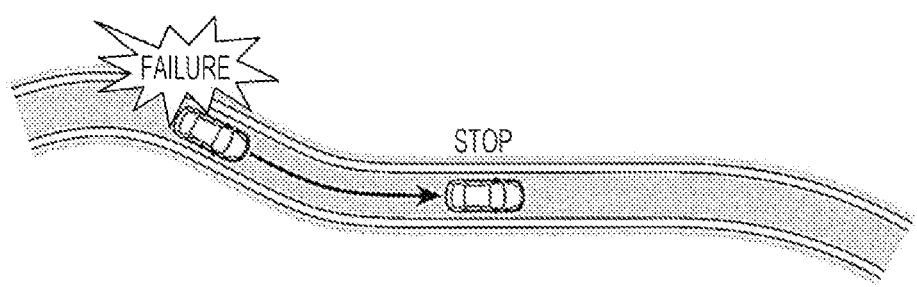

FIG. 13
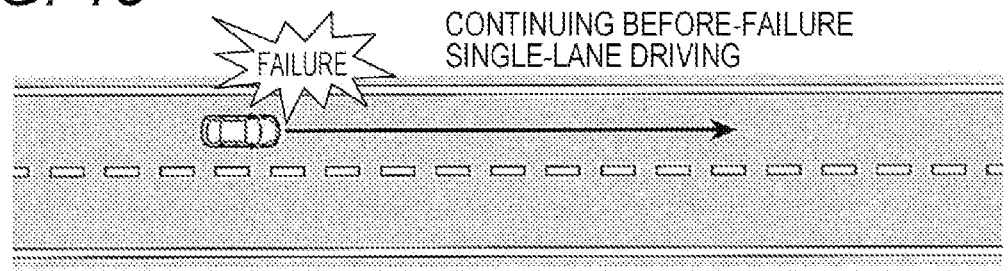
FIG. 14
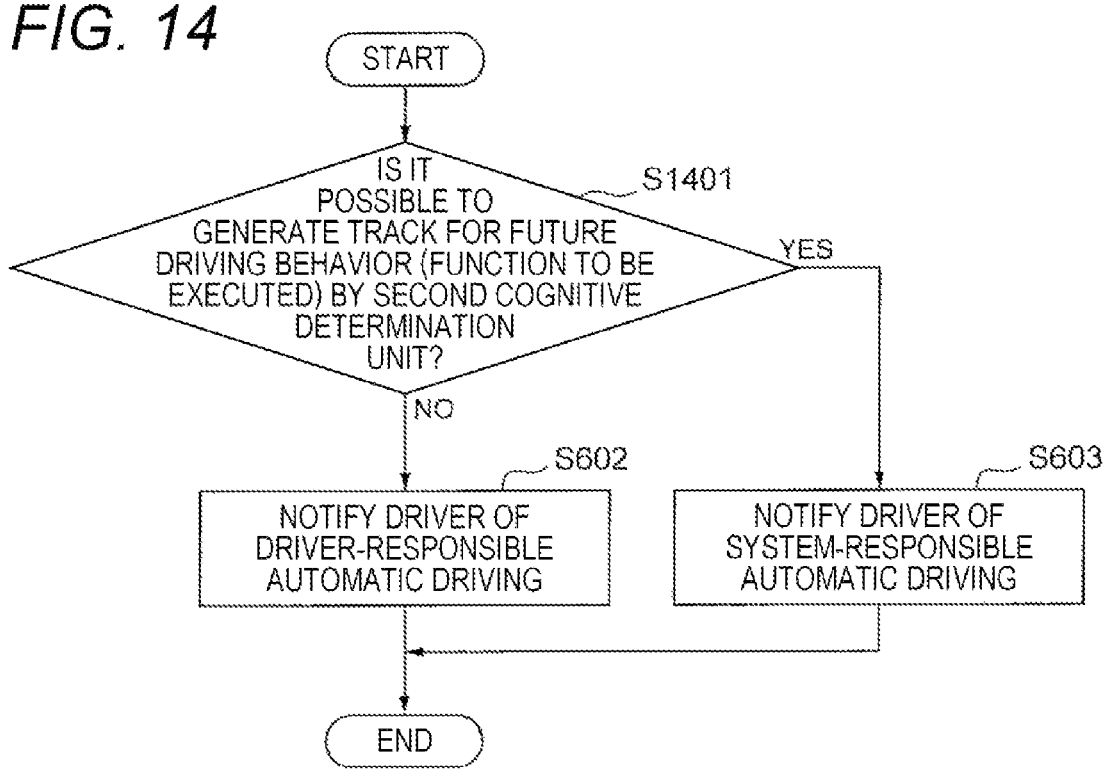
FIG. 15
| FUNCTION | AUTOMATIC TRAVELLING IN SINGLE LANE | AUTOMATIC LANE CHANGE | AUTOMATIC TRAVELLING INTO LANE-MERGING SECTION | AUOMATIC TRAVELLING INTO LANE-BRANCHED SECTION | AUTOMATIC GATE PASS |
|---|---|---|---|---|---|
| FIRST COGNITIVE DETERMINATION UNIT | ○ | ○ | ○ | ○ | ○ |
| SECOND COGNITIVE DETERMINATION UNIT | ○ | × | × | × | × |
(○: YES, ×: NO)

FIG. 17
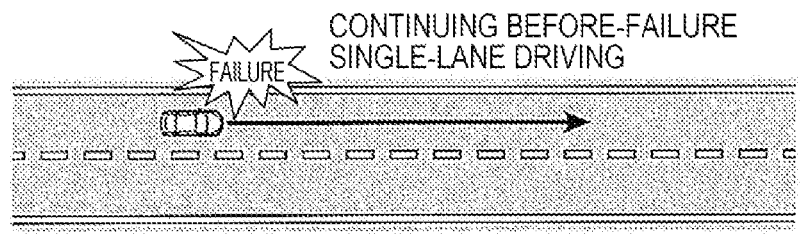
CONTINUING BEFORE-FAILURE SINGLE-LANE DRIVING
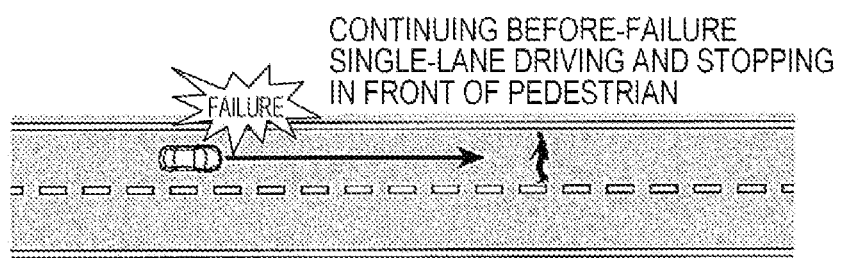
CONTINUING BEFORE-FAILURE SINGLE-LANE DRIVING AND STOPPING IN FRONT OF PEDESTRIAN
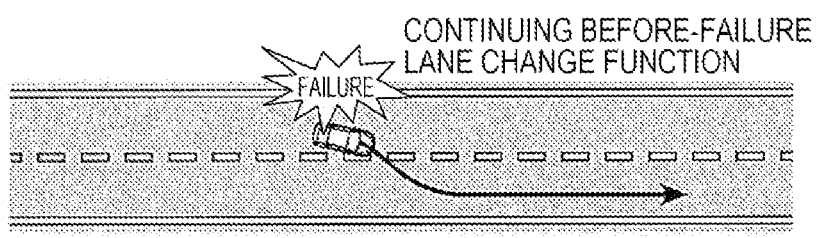
CONTINUING BEFORE-FAILURE LANE CHANGE FUNCTION
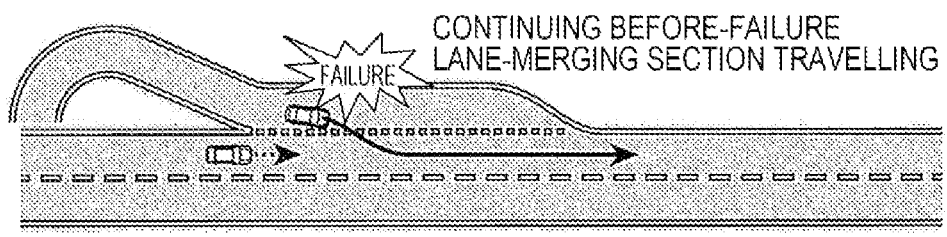
CONTINUING BEFORE-FAILURE LANE-MERGING SECTION TRAVELLING
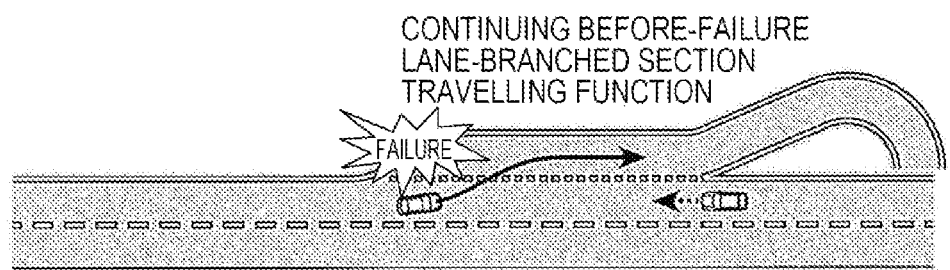
CONTINUING BEFORE-FAILURE LANE-BRANCHED SECTION TRAVELLING FUNCTION

FIG. 18

| FUNCTION | AUTOMATIC TRAVELLING IN SINGLE LANE | BRAKE-BASED AUTOMATIC OBSTACLE AVOIDANCE (PEDESTRIAN OR OBSTACLE) | AUTOMATIC LANE CHANGE | AUTOMATIC TRAVELLING INTO LANE-MERGING SECTION | AUTOMATIC TRAVELLING INTO LANE-BRANCHED SECTION | TRAVELLING AT INTERSECTION | STEERING-BASED AUTOMATIC OBSTACLE AVOIDANCE (PEDESTRIAN OR OBSTACLE) |
|---|---|---|---|---|---|---|---|
| FIRST COGNITIVE DETERMINATION UNIT | ○ | ○ | ○ | ○ | ○ | ○ | ○ |
| SECOND COGNITIVE DETERMINATION UNIT | ○ | ○ | ○ | ○ | ○ | × | × |

(○: YES, ×: NO)

VEHICLE CONTROL SYSTEM

TECHNICAL FIELD

The present invention relates to a vehicle control system.

BACKGROUND ART

PTL 1 discloses an automatic driving control device including a precautionary safety system performing automatic driving control at an automation level 2 and an automatic driving system performing automatic driving control at an automation level 3, wherein the precautionary safety system and the automatic driving system are configured as independent processing systems from each other. In the automatic driving control device described in PTL 1, if the precautionary safety system fails while the automatic driving control is performed by the precautionary safety system, the automatic driving control is shifted to that performed by the automatic driving system. If the automatic driving system fails while the automatic driving control is performed by the automatic driving system, the automatic driving control is shifted to that performed by the precautionary safety system. In other words, rather than a full-dual system configuration, the relatively high-cost automatic driving system is backed up by the relatively low-cost precautionary safety system to ensure safety while suppressing an increase in cost.

CITATION LIST

Patent Literature

PTL 1: JP 2017-157067 A

SUMMARY OF INVENTION

Technical Problem

Meanwhile, if hardware for mounting the automatic driving system, which is a main system, has different specifications from that for mounting the precautionary safety system, which is a sub-system, driving functions that can be implemented by the respective systems are different. However, since the conventional technique described in PTL 1 does not consider what functions can be backed up by the precautionary safety system, it cannot be said all the functions of the automatic driving system can be backed up by the precautionary safety system. That is, in the event that the automatic driving system cannot be backed up by the precautionary safety system when the automatic driving system fails, a driver may suddenly have to take over driving.

Under the aforementioned circumstances, an object of the present invention is to provide a vehicle control system capable of improving the safety of the automatic driving system.

Solution to Problem

One of preferred modes of the present invention for solving the aforementioned problems is as follows. A vehicle control system including a first control device that implements at least two automatic driving-related functions, a second control device that implements fewer automatic driving-related functions than the first control device, and a vehicle motion control device that automatically controls a driving state of a host vehicle based on a function planned by the first or second control device according to the preferred mode of the invention includes: a backup determination unit that determines whether or not the future function planned by the first or second control device is backed up by the second control device; and a notification unit that notifies a driver that system responsibility is switched to driver responsibility, when the backup determination unit determines that the backup is not available.

Advantageous Effects of Invention

According to the present invention, it is determined whether or not a future automatic driving function can be backed up by the second control device, and it is notified, when it is determined that the backup is not available, that system responsibility will be switched to driver responsibility without continuing system-responsible automatic driving. As a result, the driver can take a standby state before the function that cannot be backed up by the second control device is executed. Therefore, even if a failure occurs in the first control device during the execution of the function, the driver is not suddenly required to operate a steering wheel from a system-responsible driving state. That is, the safety of the automatic driving system can be improved.

Other problems, configurations, and effects that are not described above will be apparent from the following description of embodiments.

BRIEF DESCRIPTION OF DRAWINGS

FIG. 4 is a block diagram of a second cognitive determination unit in the first and second embodiments.

FIG. 5 is a diagram illustrating an example of a backup method in the event of a failure in the first embodiment.

FIG. 13 is a diagram illustrating an example of a backup method in the event of a failure in the third embodiment.

FIG. 14 is a flowchart of backup availability determination in the third embodiment.

FIG. 15 is a list of functions of the first cognitive determination unit and the second cognitive determination unit in the third embodiment.

FIG. 17 is a diagram illustrating an example of a backup method in the event of a failure in the fourth embodiment.

FIG. 18 is a list of functions of the first cognitive determination unit and the second cognitive determination unit in the fourth embodiment.

DESCRIPTION OF EMBODIMENTS

Hereinafter, embodiments of vehicle control systems according to the present invention will be described with reference to the drawings.

First Embodiment

Figure 1:
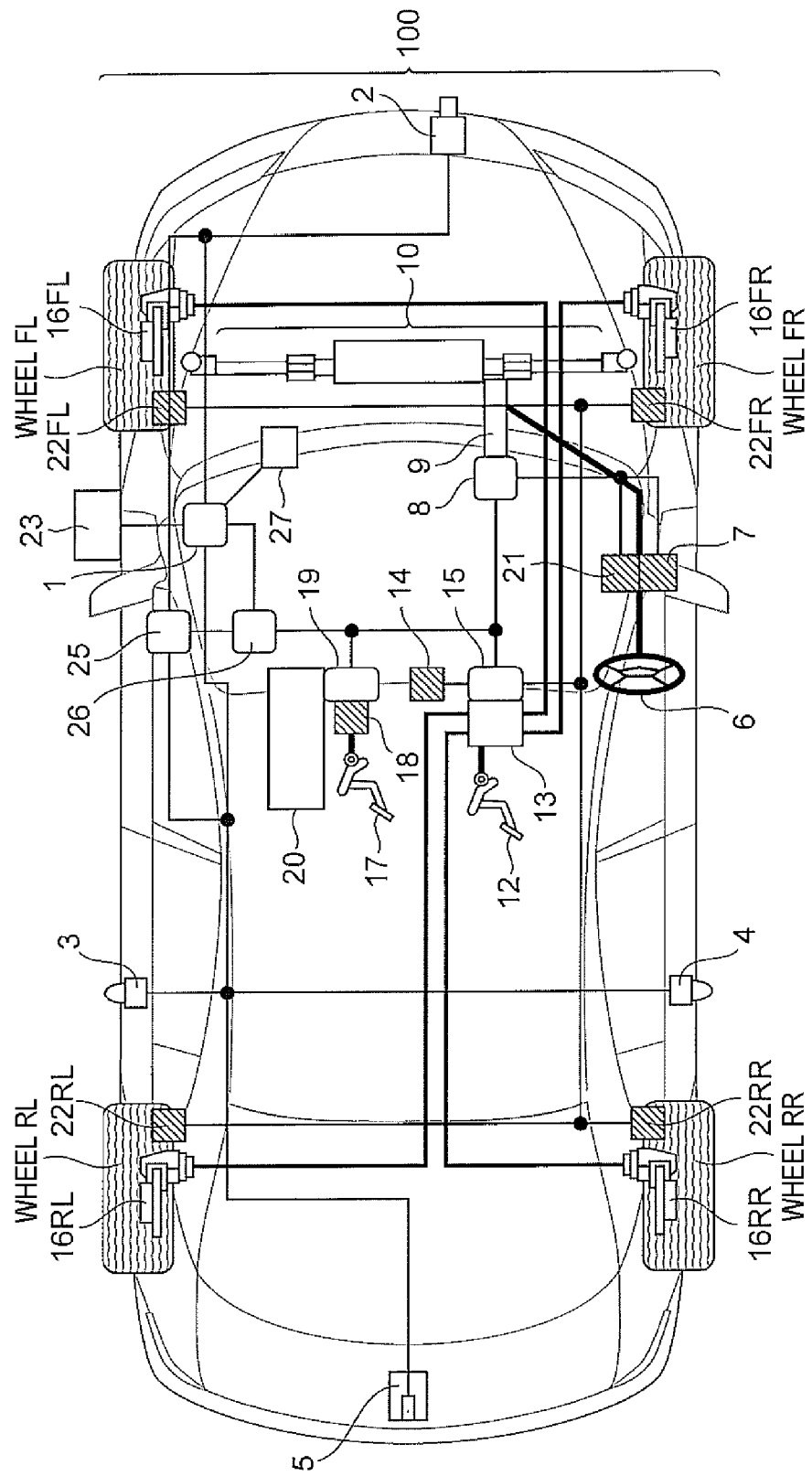
FIG. 1 is an entire system configuration diagram of a vehicle control system in first to fourth embodiments.

FIG. 1 is a system configuration diagram illustrating a hardware configuration of a vehicle control system 100. It should be noted that, in the drawing, wheel FL refers to a left-front wheel, wheel FR refers to a right-front wheel, wheel RL refers to a left-rear wheel, and wheel RR refers to a right-rear wheel.

The vehicle control system 100 includes: sensors 2, 3, 4, and 5 mounted, for example, on a vehicle such as an automobile and basically sensing an external field; a global navigation satellite system (GNSS) 27 detecting an absolute position of the host vehicle; a first control device calculating target tracks for a plurality of automatic driving functions (automatic driving-related functions), such as automatic driving in a lane of the host vehicle, automatic lane change, automatic driving into a lane-merging section, and automatic driving into a lane-branched section, based on information of the sensors 2, 3, 4, and 5 and the GNSS 27; a second control device 25 calculating target tracks for fewer automatic driving functions than the first control device 1 based on the information from the sensors 2, 3, 4, and 5 and GNSS 27; a steering control mechanism 10, a brake control mechanism 13, and a throttle control mechanism 20 as actuators that implements the automatic driving; a human machine interface (HMI) 23 as a notification unit that notifies a driver or the like of the information; a vehicle motion control device 26 computing respective command values for the actuators 10, 13, and 20 based on the target tracks of the first control device 1 and the second control device 25; and a steering control device 8, a brake control device 15, and a throttle control device 19 as control devices that controls the actuators 10, 13 and 20, respectively, based on the command values of the vehicle motion control device 26. The steering control device 8 controls the steering control mechanism 10 based on the corresponding command value, the brake control device 15 controls the brake control mechanism 13 based on the corresponding command value to regulate a brake force distribution to each of the wheels (wheel FL, wheel FR, wheel RL, and wheel RR), and the throttle control device 19 controls the throttle control mechanism 20 based on the corresponding command value to regulate a torque output of an engine (not shown).

The sensors 2, 3, 4, and 5 that senses the external field, which is for sensing lane markers and signs of the lane of the host vehicle (the lane in which the host vehicle is travelling), another vehicle around the host vehicle (which may hereinafter be referred to as an object), etc., includes a stereo camera 2 on the front side, laser radars 3 and 4 on the left and right sides, and a millimeter-wave radar 5 on the rear side in this embodiment. By these sensors, a relative distance and a relative speed of the host vehicle to a surrounding vehicle can be detected. In addition, the stereo camera 2 on the front side can detect sites next to the lane markers of the lane in which the host vehicle is travelling, etc. It should be noted that the sensors are configured as a combination of the aforementioned sensors as an example in this embodiment, but are not limited thereto. The sensors may be combined with an ultrasonic sensor, a monocular camera, an infrared camera, or the like. The GNSS 27 detects an absolute position of the host vehicle. The information from the sensors 2, 3, 4, and 5 and the GNSS 27 is input to the first control device 1 and the second control device 25.

Although not shown in detail in FIG. 1, each of the first control device 1 and the second control device 25 is constituted by, for example, an ECU including a CPU, a ROM, a RAM, and an input/output device. For example, the ROM stores cognition and determination programs for implementing automatic driving such as automatic driving in a lane of the host vehicle, automatic lane change, automatic driving into a lane-merging section, and automatic driving into a lane-branched section, and the CPU generates a target track for the automatic driving and transmits the target track to the vehicle motion control device 26. The vehicle motion control device 26 computes respective command values for the actuators 10, 13, and 20 and communicates with the respective control devices 8, 15, and 19 of the actuators 10, 13, and 20, so that the vehicle follows the target track sent from the first control device 1 or the second control device 25. The respective control devices 8, 15, and 19 of the actuators 10, 13, and 20 receive the command values from the vehicle motion control device 26 by communicating therewith and control the respective actuators 10, 13, and 20 based on the corresponding command values.

Next, the operations of a steering, a brake, and an accelerator constituting the actuators 10, 13, and 20, respectively, will be described.

First of all, the operation of the brake will be described. A pedaling force of the driver stepping on a brake pedal 12 is boosted by a brake booster (not shown), and a hydraulic pressure is generated by a master cylinder (not shown) in response to the pedaling force. The generated hydraulic pressure is supplied to wheel cylinders 16FL to 16RR provided in the respective wheels via the brake control mechanism 13. Each of the wheel cylinders 16FL to 16RR includes a cylinder (not shown), a piston, a pad, etc. The piston is propelled by hydraulic fluid supplied from the master cylinder, and the pad connected to the piston is pressed against a disc rotor. The disc rotor rotates together with the vehicle wheel. Accordingly, a braking torque acting on the disc rotor is a braking force acting between the vehicle wheel and a road surface. As described above, the braking force can be generated on each wheel in accordance with the operation of the brake pedal by the driver.

Although not shown in detail in FIG. 1, the brake control device 15 includes, for example, a CPU, a ROM, a RAM, and an input/output device, like the first control device 1 or the like. Sensor signals from a combined sensor 14 capable of detecting a longitudinal acceleration, a horizontal acceleration, and a yaw rate, vehicle wheel speed sensors 22FL to 22RR provided on the respective wheels, a braking force command value from the above-described vehicle motion control device 26, and a steering wheel angle detection device 21 via the steering control device 8 to be described below are input to the brake control device 15. In addition, an output of the brake control device 15 is connected to the brake control mechanism 13 including a pump (not shown) and a control valve, and a certain braking force can be generated on each wheel independently of the operation of the brake pedal by the driver. The brake control device 15 serves to estimate the spin, the drift out, the vehicle wheel lock, etc. of the vehicle, based on the above-described various kinds of information, and control the brake control mechanism 13 or the like to generate a braking force of a corresponding wheel so that they are suppressed, thereby increasing the steering stability of the driver. In addition, the first control device 1 communicates with the brake control device 15 (via the vehicle motion control device 26) for a brake command value, so that a certain braking force can be generated in the vehicle. However, this embodiment is not limited to the brake control device 15, and another actuator such as brake-by-wire may alternatively be used.

Next, the operation of the steering will be described. A steering torque and a steering wheel angle input by the driver through a steering wheel 6 are detected by a steering torque detection device 7 and the steering wheel angle detection device 21, respectively, and the steering control device 8 controls a motor 9 based on information thereof to generate an assist torque. It should be noted that, although not shown in detail in FIG. 1, the steering control device 8 also includes, for example, a CPU, a ROM, a RAM, and an input/output device, like the first control device 1 or the like. The steering control mechanism 10 is moved by a combined force of the steering torque of the driver and the assist torque by the motor 9, and the front wheels are turned. Meanwhile, a reaction force from the road surface is transmitted to the steering control mechanism 10 according to a turned angle of the front wheels and then transmitted to the driver as a road surface reaction force.

The steering control device 8 can control the steering control mechanism 10 by generating a torque by means of the motor 9, independently of the steering operation by the driver. Therefore, the first control device 1 communicates with the steering control device 8 (via the vehicle motion control device 26) for a target steering torque command value, so that the front wheels can be controlled to a certain turn angle. However, this embodiment is not limited to the steering control device 8, and another actuator such as steering-by-wire may alternatively be used.

Next, the accelerator will be described. A driver's pedal stepping amount on an accelerator pedal 17 is detected by a stroke sensor 18 and input to the throttle control device 19. It should be noted that, although not shown in detail in FIG. 1, the throttle control device 19 also includes, for example, a CPU, a ROM, a RAM, and an input/output device, like the first control device 1 or the like. The throttle control device 19 adjusts an opened degree of a throttle according to the pedal stepping amount on the accelerator pedal 17 to control (a torque output of) the engine (not shown). The vehicle can be accelerated in accordance with the operation of the accelerator pedal by the driver as described above. In addition, the throttle control device 19 can control the opened degree of the throttle, independently of the operation of the accelerator pedal by the driver. Therefore, the first control device 1 communicates with the throttle control device 8 (via the vehicle motion control device 26) for a target acceleration command value, so that a certain acceleration can be generated in the vehicle.

As described above, according to situations of surrounding vehicles and the like, the vehicle control system 100 can appropriately control a speed of the vehicle by regulating the brake and the throttle, and simultaneously, automatically implement automatic driving in a lane of the host vehicle, automatic lane change, automatic driving into a lane-merging section, automatic driving into a lane-branched section, or the like by controlling the steering.

Figure 2:
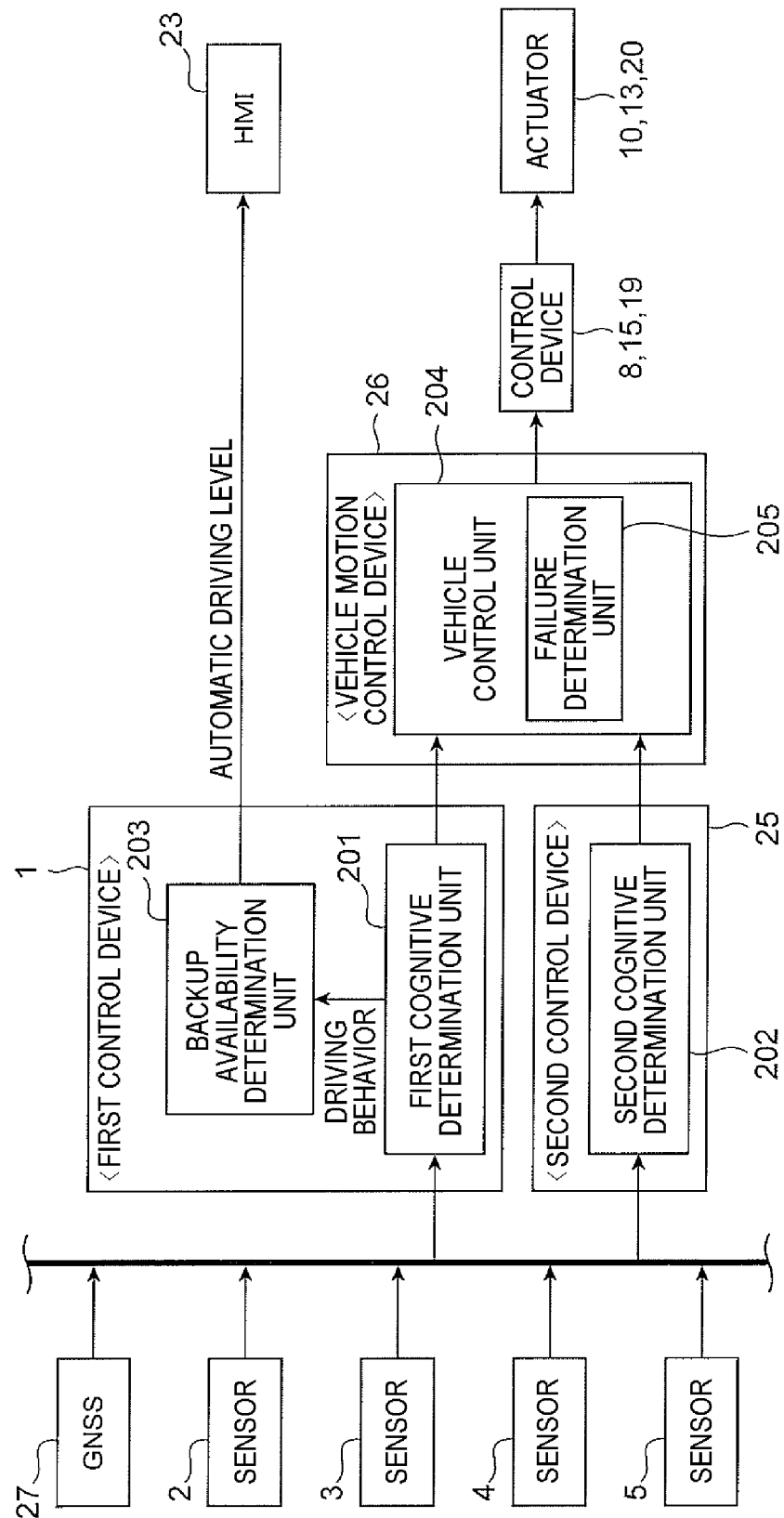
FIG. 2 is an entire block diagram of the vehicle control system in the first to fourth embodiments.

FIG. 2 illustrates an entire functional block of the vehicle control system 100. The first control device 1 includes a first cognitive determination unit 201 and a backup availability determination unit 203, the second control device 25 includes a second cognitive determination unit 202, and the vehicle motion control device 26 includes a vehicle control unit 204.

As illustrated in FIG. 2, the information from the sensors 2, 3, 4, and 5 and the GNSS 27 is input to the first cognitive determination unit 201 of the first control device 1 and the second cognitive determination unit 202 of the second control device 25. Based on the information from the sensors 2, 3, 4, and 5 and the GNSS 27, the first cognitive determination unit 201 plans a future driving behavior (an automatic driving-related function to be executed), and the planned future driving behavior is input to the backup availability determination unit 203. The future driving behavior may also be planned by the second cognitive determination unit 202 or another block. The backup availability determination unit 203 determines whether or not the driving behavior can be backed up by the second cognitive determination unit 202 (which will be described in detail below). Based on whether or not the backup is available, the backup availability determination unit 203 notifies the driver via the HMI 23 of an automatic driving level, that is, whether the backup is not available and automatic driving is driver-responsible or the backup is available and automatic driving is system-responsible (automatic driving level). A track (target track) corresponding to the future driving behavior planned by the first cognitive determination unit 201 and a track (target track) corresponding to the future driving behavior planned by the second cognitive determination unit 202 are input to the vehicle control unit 204. The vehicle control unit 204 further includes a failure determination unit 205 to determine a failure in the first cognitive determination unit 201 and a failure of the second cognitive determination unit 202. When a failure is detected in the first cognitive determination unit 201, the vehicle control unit 204 controls a driving state (travelling state) of the host vehicle by controlling each of the actuators 10, 13 and 20 (via each of the control devices 8, 15 and 19) to follow the track from the second cognitive determination unit 202. In addition, when a failure is detected in the second cognitive determination unit 202, the vehicle control unit 204 controls a driving state (travelling state) of the host vehicle by controlling each of the actuators 10, 13 and 20 (via each of the control devices 8, 15 and 19) to follow the track from the first cognitive determination unit 201. It should be noted that the failure determination unit 205 may be mounted on the first cognitive determination unit 201 and/or the second cognitive determination unit 202, as well as the vehicle control unit 204. In addition, for determination of failure by the failure determination unit 205, a conventionally known appropriate method can be used.

A block diagram of the first cognitive determination unit 201 will be described with reference to FIG. 3. In this embodiment, the first cognitive determination unit 201 includes a map information recognition unit 301, a map database 302, a sensor fusion unit 303, a driving behavior planning unit 304, and a track planning unit 305. Based on absolute position information from the GNSS 27, information such as landmarks from the sensor 2 (stereo camera), information from an internal field sensor of the vehicle, which is not illustrated, and map information from the map database 302, the map information recognition unit 301 estimates a position of the host vehicle (self-position) on a map, and saves the estimated self-position in the map database 302 while outputting map information on surroundings of the host vehicle to the driving behavior planning unit 304 and the track planning unit 305. Here, the map database 302 stores information such as traffic rules (speed limit, pass permission, etc.), road connection status, road type (general road, expressway, etc.). The sensor fusion unit 303 integrates information on objects from the respective sensors 2, 3, 4, and 5, and outputs information on white lines, road edges, and objects to the driving behavior planning unit 304 and the track planning unit 305. The driving behavior planning unit 304 plans a future driving behavior to be taken by the host vehicle (an automatic driving-related function to be executed) based on the map information from the map information recognition unit 301 and the information on white lines, road edges, and the objects from the sensor fusion unit 303, and the planned future driving behavior is output to the track planning unit 305 and the backup availability determination unit 203 (see FIG. 2). Here, the driving behavior is an automatic driving function, for example, travelling in a lane of the host vehicle, automatic travelling into a lane-merging section, automatic lane change, travelling into a lane-branched section, turning right at an intersection, turning left at an intersection, or going straight at an intersection. However, the driving behaviors are not limited to the above-described functions, and may be expressed as information such as a travelling lane. The track planning unit 305 generates/plans a target track (a track on which the host vehicle needs to travel) based on the driving behavior, the map information, and the information on white lines, road edges, and objects, and the target track is output to (the vehicle control unit 204 of) the vehicle motion control device 26 (see FIG. 2).

Subsequently, a block diagram of the second cognitive determination unit 202 will be described with reference to FIG. 4. In this embodiment, the second cognitive determination unit 202 includes a backup track generation unit 401. The backup track generation unit 401 generates/plans a backup track as a target track based on the information from the respective sensor 2, 3, 4, and 5, and the backup track is output to (the vehicle control unit 204 of) the vehicle motion control device 26 (see FIG. 2). In this embodiment, the backup track generation unit 401 of the second cognitive determination unit 202 generates a track for stopping along a lane in which the host vehicle is travelling as a backup track when the first control device 1 fails as illustrated in FIG. 5. At this time, the backup track generation unit 401 of the second cognitive determination unit 202 causes hazard lights to blink to alert a following vehicle.

Figure 6:
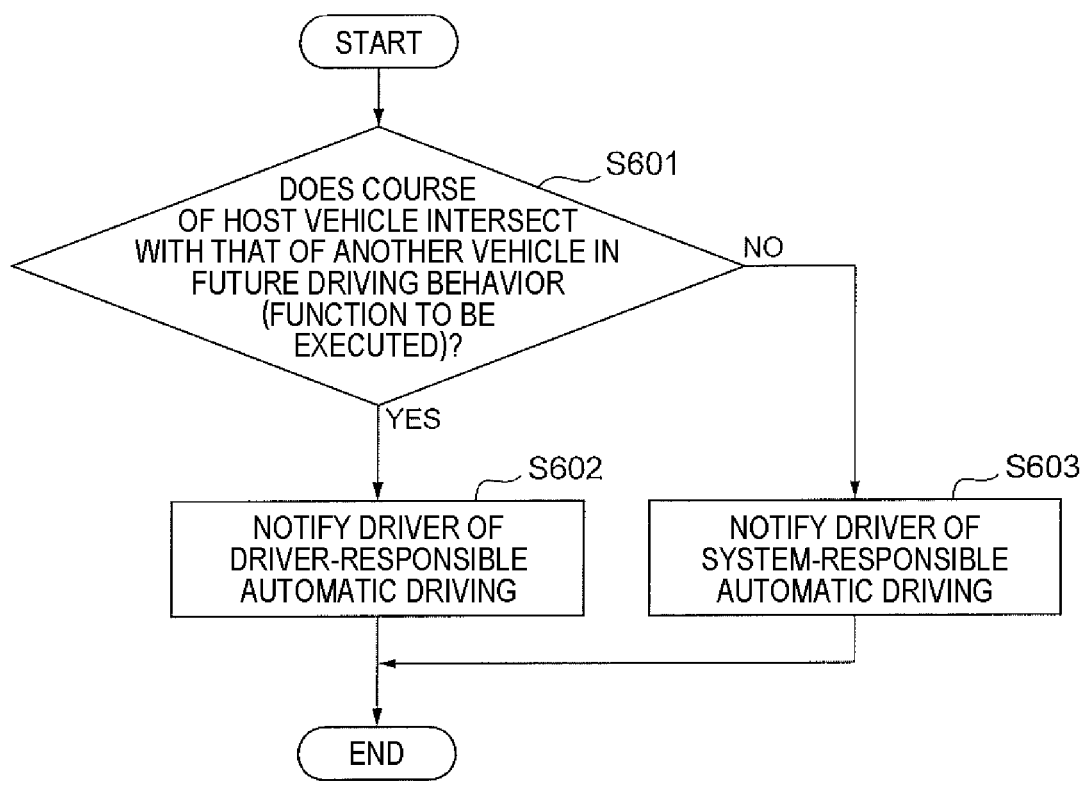
FIG. 6 is a flowchart of backup availability determination in the first embodiment.

Next, FIG. 6 illustrates a flowchart of backup availability determination by the backup availability determination unit 203. The backup availability determination unit 203 determines whether or not backup is available with the track for stopping along the lane in which the host vehicle is travelling (that is, a backup track that can be generated by the second control device 25) (together with driving sections in the driving behavior, specifically, backup-available and backup-unavailable sections indicating a section in which the backup is available and a section in which the backup is not available) when the first control device 1 fails while the host vehicle is travelling according to the driving behavior. Specifically, in S601, it is determined whether or not a course of the host vehicle intersects with that of another vehicle during the driving behavior. When it is determined that the course of the host vehicle intersects with that of another vehicle (Yes), it is determined that backup is not available with the track (backup track) for stopping in the lane of the host vehicle because deceleration and stop are not certainly safe ways, and the process moves onto S602. In S602, the driver is notified in advance (before the first control device 1 fails) via the HMI 23 that automatic driving will be driver-responsible in the future during (the driving section of) the driving behavior. On the other hand, in S601, when it is determined that the course of the host vehicle does not intersect with that of another vehicle during the driving behavior (No), it is determined that backup is available with the track (backup track) for stopping in the lane of the host vehicle because it is safe even though the host vehicle stops in its lane, and the process moves onto S603. In S603, the driver is notified in advance (before the first control device 1 fails) via the HMI 23 that automatic driving will be system-responsible in the future during (the driving section of) the driving behavior. That is, in this embodiment, the backup availability determination unit 203 determines that safe backup is available except for an operation during which a course intersects with that of another vehicle, such as travelling at an intersection, travelling into a lane-merging section, or changing a lane.

Figure 7:
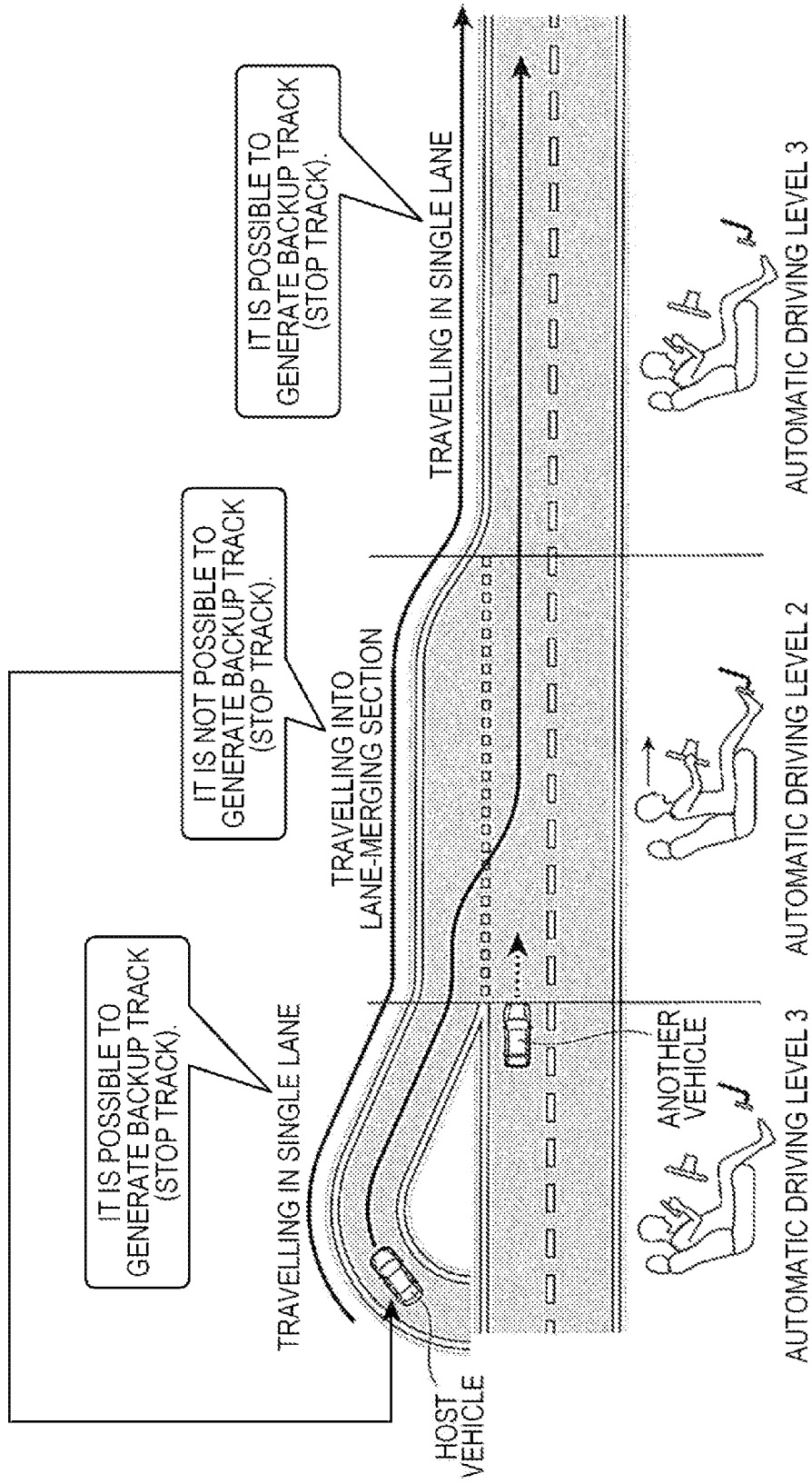
FIG. 7 is a diagram illustrating an operation example of the vehicle control system when applied to the first embodiment.

FIG. 7 illustrates an operation example of the vehicle control system 100 according to the first embodiment when applied.

FIG. 7 shows a scene in which the host vehicle is travelling toward an acceleration section to enter into an expressway. As described with reference to FIG. 3, the driving behavior planning unit 304 plans a future driving behavior to be taken by the host vehicle to travel based on the map information and the information on white lines, road edges, and objects. Here, it is planned that the host vehicle travels in a single lane in the acceleration section, then enters into a lane-merging section, and thereafter travels in a single lane of a main road. The planning of the driving behaviors is performed regularly or when the host vehicle reaches a predetermined position. Subsequently, as described in the flowchart illustrated in FIG. 6, the backup availability determination unit 203 determines whether or not the driving behavior can be backed up by (the backup track of) the second control device 25 when a failure occurs in the first control device 1. Here, the backup availability determination unit 203 determines that travelling in a single lane can be backed up by the track (backup track) for stopping along the lane in which the host vehicle is travelling and notifies the driver via the HMI 23 that automatic driving will be system-responsible (for example, automatic driving level 3), and determines that travelling into a lane-merging section cannot be backed up by the track (backup track) for stopping along the lane in which the host vehicle is travelling and notifies the driver via the HMI 23 that automatic driving will be driver-responsible (for example, automatic driving level 2) (in other words, the system-responsible automatic driving will be switched to the driver-responsible automatic driving in the lane-merging section).

Figure 8:
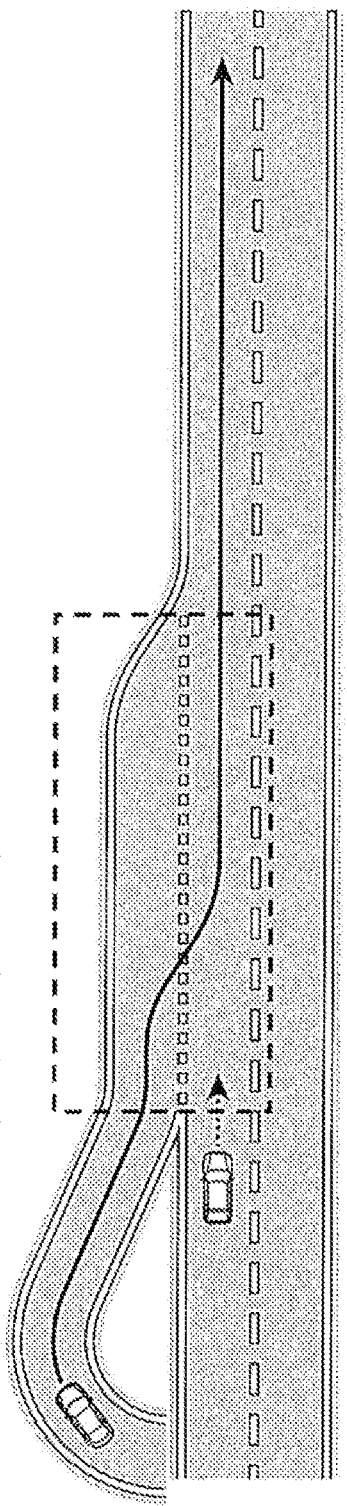
FIG. 8 is a diagram illustrating an example of a method of notifying a driver via an HMI in the first embodiment.

As a method of notifying the driver through the HMI 23, for example, as illustrated in FIG. 8, a future driving behavior to be implemented is shown on a screen, and the driver is urged to hold onto the steering wheel a few seconds to a few tens of seconds before the driving behavior begins (a few seconds to a few tens of seconds before the host vehicle reaches the lane-merging section in which the switching to the driver-responsible automatic driving will happen). However, the notification through the HMI 23 is not limited to the display for urging the driver to hold onto the steering wheel, and an automatic driving level may be displayed or it may be clearly indicated who is responsible for the driving behavior. In addition to what are described above, an approval for executing a function may be obtained from the driver during the driver-responsible automatic driving.

According to the vehicle control system 100 in the first embodiment described above, a future driving behavior is planned, and it is determined whether or not the future driving behavior can be backed up by the track (backup track) for stopping along the lane in which the host vehicle is travelling, which is generated by the second control device 25, when a failure occurs in the first control device 1 during the driving behavior. When it is determined that the backup is not available, the system-responsible automatic driving can be switched to the driver-responsible automatic driving. That is, a driving behavior that can be backed up by the second control device 25 can be executed in a system-responsible automatic driving mode, and a driving behavior that cannot be backed up by the second control device 25 can be executed in a driver-responsible automatic driving mode. Therefore, even if a failure occurs in the first control device 1 during automatic driving for travelling into a lane-merging section, changing a lane, or travelling at an intersection, the driver is not suddenly required to operate the steering wheel from a system-responsible driving state. That is, safety can be ensured at a low cost even when the first control device 1 fails, thereby improving the safety of an automatic driving system (or a driving support system).

Second Embodiment

The first embodiment is an embodiment of a vehicle control system 100 for stopping the host vehicle along a lane in which the host vehicle is travelling in the event of a failure, but the second embodiment is an embodiment of a vehicle control system 100 for stopping the host vehicle on a shoulder next to the lane in which the host vehicle is travelling in the event of a failure to ensure safety. In the second embodiment, the system configuration diagram and the block diagram of the vehicle control system 100, the block diagram of the first cognitive determination unit 201 of the first control device 1, and the block diagram of the second cognitive determination unit 202 of the second control device 25 are basically the same as those in the first embodiment described with reference to FIGS. 1 to 4. Therefore, the parts having the same functions as those in the first embodiment will be denoted by the same reference numerals and the description thereof will be omitted, and the differences will be mainly described below.

Figure 9:
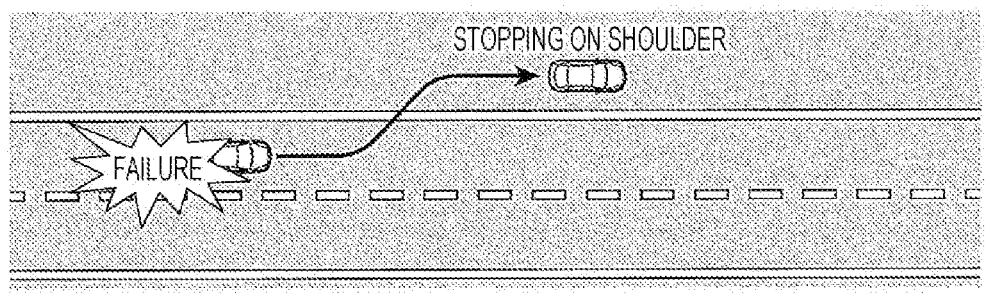
FIG. 9 is a diagram illustrating an example of a backup method in the event of a failure in the second embodiment.

FIG. 9 illustrates a backup track when the first control device 1 fails. In this embodiment, as illustrated in FIG. 9, the backup track generation unit 401 of the second cognitive determination unit 202 generates a backup track for stopping the host vehicle at an edge of the road (the shoulder), based on the information on white lines, road edges, and objects from the respective sensors 2, 3, 4, and 5.

Figure 10:
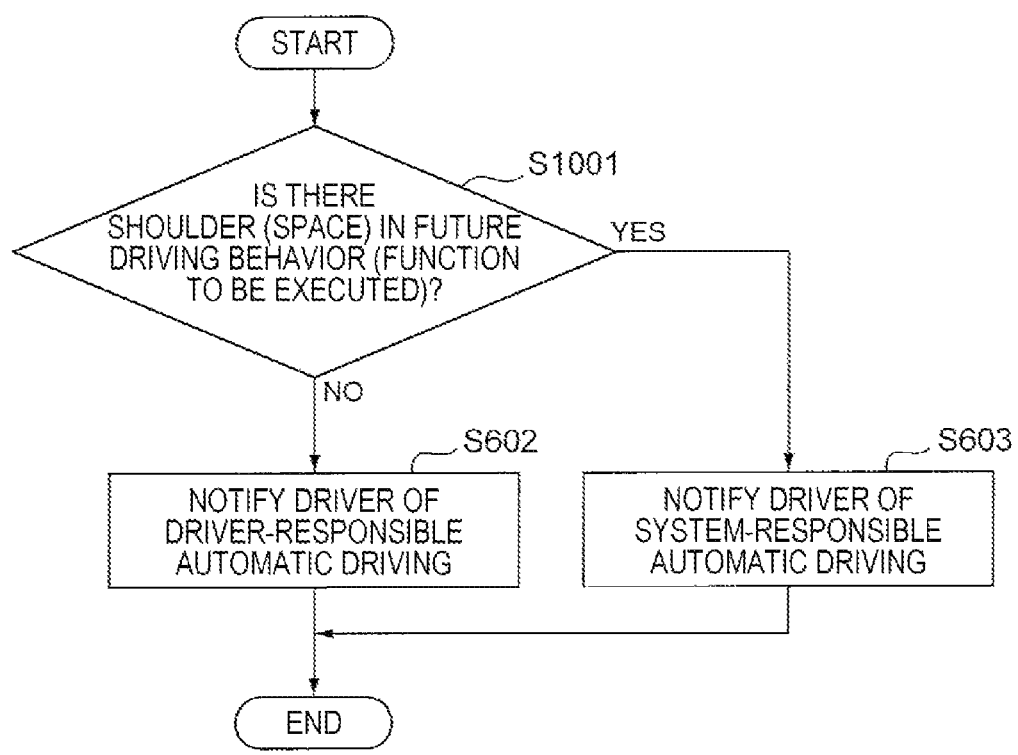
FIG. 10 is a flowchart of backup availability determination in the second embodiment.

FIG. 10 illustrates a flowchart of backup availability determination by the backup availability determination unit 203 in the second embodiment. In this embodiment, the sensor information and/or the map information (see FIG. 3, etc.) are input to the backup availability determination unit 203 in addition to the driving behavior planned by the first cognitive determination unit 201. In S1001, the backup availability determination unit 203 determines whether or not backup is available for stopping on the shoulder (that is, a backup track that can be generated by the second control device 25) during the driving behavior (together with driving sections in the driving behavior, specifically, backup-available and backup-unavailable sections indicating a section in which the backup is available and a section in which the backup is not available). Specifically, it is determined whether or not there is a space on the shoulder for the host vehicle to stop during the driving behavior. If it is determined that there is no space for stopping on the shoulder (No), it is determined that backup is not available with the track (backup track) for stopping on the shoulder because the host vehicle cannot stop safely on the shoulder, and the process moves onto S602. On the other hand, in S1001, if it is determined that there is a space on the shoulder for the host vehicle to stop during the driving behavior (Yes), it is determined that backup is available with the track (backup track) for stopping on the shoulder because the host vehicle can stop safely on the shoulder, and the process moves onto S603. S602 and S603 are the same as those in the first embodiment, and thus, the description thereof will be omitted.

Figure 11:
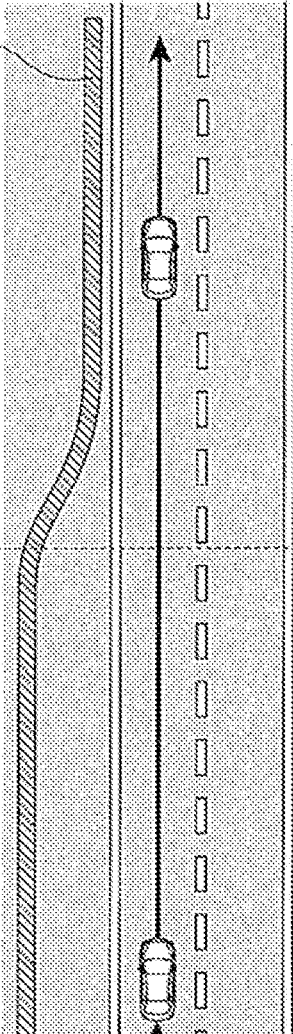
FIG. 11 is a diagram illustrating an operation example of the vehicle control system when applied to the second embodiment.

FIG. 11 illustrates an operation example of the vehicle control system 100 according to the second embodiment when applied. Both driving behaviors shown in FIG. 11 are behaviors during which the host vehicle travels in a single lane. However, during (a driving section of) a driving behavior on the left of the dotted line a in the drawing, there is a space for stopping on the shoulder, and thus, the backup availability determination unit 203 determines that backup is available with (a backup track of) the second control device 25 when a failure occurs in the first control device 1 (in other words, it is possible to generate a backup track). On the other hand, during (a driving section of) a driving behavior on the right of the dotted line a in the drawing, there is no space on the shoulder due to a sidewall, and thus, the backup availability determination unit 203 determines that backup is not available with (a backup track of) the second control device 25 when a failure occurs in the first control device 1 (in other words, it is not possible to generate a backup track). The backup availability determination unit 203 determines that (earlier) travelling on the left of the dotted line a in the drawing can be backed up by the track (backup track) for stopping on the shoulder and notifies the driver via the HMI 23 that automatic driving will be system-responsible (for example, automatic driving level 3), and determines that (later) travelling on the right of the dotted line a in the drawing cannot be backed up by the track (backup track) for stopping on the shoulder and notifies the driver via the HMI 23 that automatic driving will be driver-responsible (for example, automatic driving level 2) (in other words, the system-responsible automatic driving will be switched to the driver-responsible automatic driving in a section with no space on the shoulder).

According to the vehicle control system 100 in the second embodiment described above, a future driving behavior is planned, and it is determined whether or not the future driving behavior can be backed up by the track (backup track) for stopping on the shoulder, which is generated by the second control device 25, when a failure occurs in the first control device 1 during the driving behavior. When it is determined that the backup is not available, the system-responsible automatic driving can be switched to the driver-responsible automatic driving. That is, a driving behavior that can be backed up by the second control device 25 can be executed in a system-responsible automatic driving mode, and a driving behavior that cannot be backed up by the second control device 25 can be executed in a driver-responsible automatic driving mode. Therefore, even if a failure occurs in the first control device 1 during automatic driving in a situation where there is no space on the shoulder, the driver is not suddenly required to operate the steering wheel from a system-responsible driving state. That is, safety can be ensured at a low cost even when the first control device 1 fails, thereby improving the safety of an automatic driving system (or a driving support system).

Third Embodiment

The third embodiment is an embodiment of a vehicle control system 100 for continuing a before-failure function when the first control device 1 fails, and particularly, a vehicle control system 100 for continuing a single-lane automatic driving function. In the third embodiment, the system configuration diagram and the block diagram of the vehicle control system 100 and the block diagram of the first cognitive determination unit 201 of the first control device 1 are basically the same as those in the first embodiment described with reference to FIGS. 1 to 3. Therefore, the same parts as those in the first or second embodiment will be denoted by the same reference numerals and the description thereof will be omitted, and the differences will be mainly described below.

Figure 12:
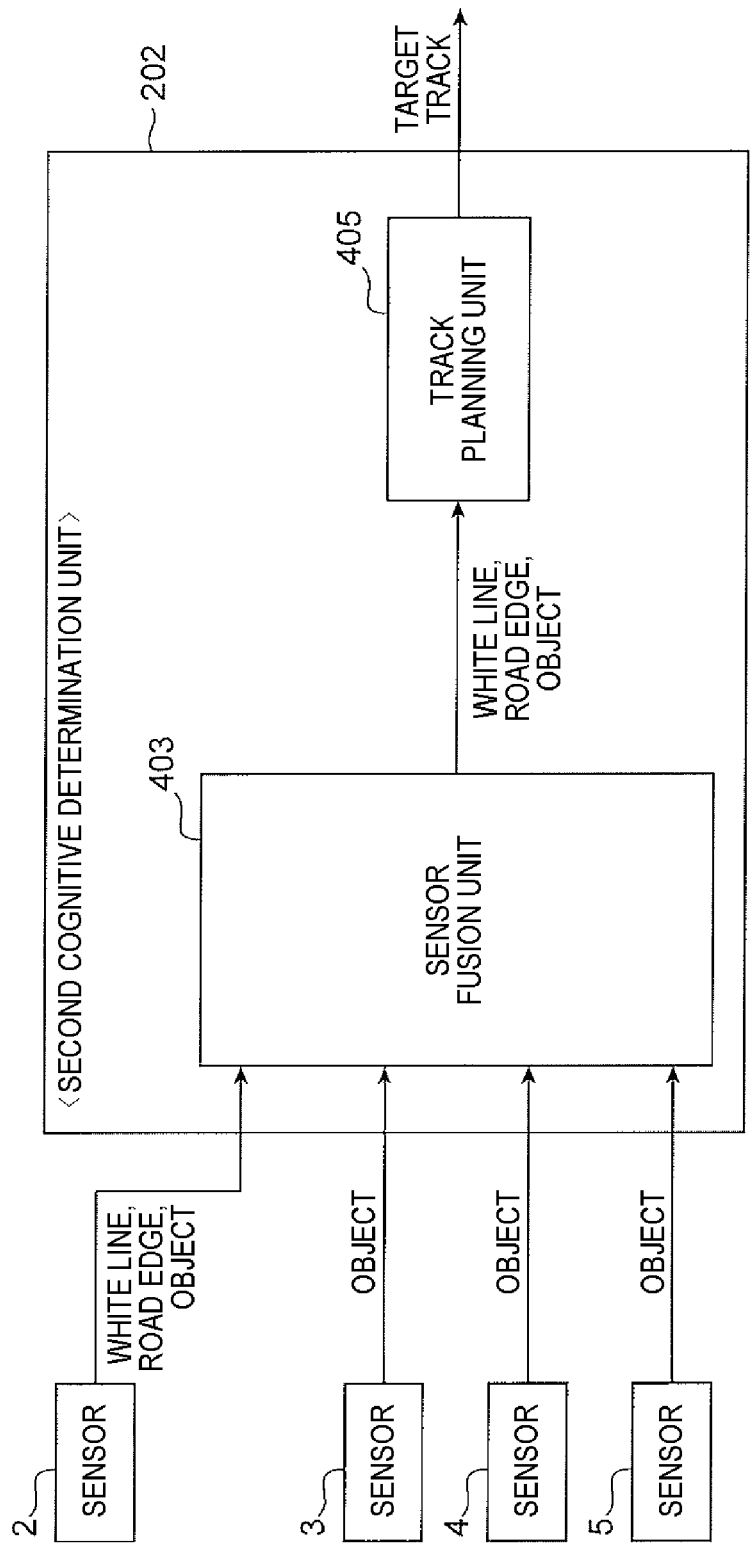
FIG. 12 is a block diagram of a second cognitive determination unit in the third embodiment.

FIG. 12 illustrates a block diagram of the second cognitive determination unit 202 of the second control device 25. In the third embodiment, as illustrated in FIG. 12, the second cognitive determination unit 202 includes a sensor fusion unit 403 and a track planning unit 405. The operations and processes of the sensor fusion unit 403 and the track planning unit 405 of the second cognitive determination unit 202 are basically the same as those of the sensor fusion unit 303 and the track planning unit 305 of the first cognitive determination unit 201 described with reference to FIG. 3. Based on such a configuration, the second cognitive determination unit 202 in this embodiment has a function to generate/plan a track (target track) for travelling in a single lane (in other words, in a lane of the host vehicle) as a backup track, based on the information on white lines, road edges, and objects from the respective sensors 2, 3, 4, and 5.

FIG. 13 illustrates a backup method of the second control device 25 when the first control device 1 fails. In the third embodiment, when the first control device 1 fails while the host vehicle is travelling in a single lane, the function is maintained by the track (backup track) for travelling in the single lane, which is planned by (the second cognitive determination unit 202 of) the second control device 25. That is, in the first and second embodiments, the host vehicle is stopped in its lane or on the shoulder, but in the third embodiment, the before-failure function can be continued, that is, travelling in the lane of the host vehicle can be continued by generating a track for travelling in the lane of the host vehicle, rather than stopping the host vehicle immediately in the event of a failure.

Next, backup availability determination by the backup availability determination unit 203 depending on whether to maintain the function by travelling in the single lane will be described with reference to FIG. 14. In this embodiment, in S1401, the backup availability determination unit 203 determines whether or not a track for continuing a before-failure driving behavior when the first control device 1 fails can be generated by the second cognitive determination unit 202 of the second control device 25 (together with driving sections in the driving behavior, specifically, backup-available and backup-unavailable sections indicating a section in which the backup is available and a section in which the backup is not available). If it is determined that such a track cannot be generated, that is, backup is not available using the second control device 25 (No), the process moves onto S602. On the other hand, if it is determined that such a track can be generated, that is, backup is available using the second control device 25 (Yes), the process moves onto S603. S602 and S603 are the same as those in the first embodiment, and thus, the description thereof will be omitted.

FIG. 15 is a table summarizing automatic driving functions that can be implemented by the first cognitive determination unit 201 and the second cognitive determination unit 202. The first cognitive determination unit 201 can implement, for example, automatic travelling in a single lane, automatic lane change, automatic travelling into a lane-merging section, automatic travelling into a lane-branched section, and automatic gate pass. On the other hand, as described above, the second cognitive determination unit 202 can implement only automatic travelling in a single lane. That is, in this embodiment, the functions (automatic driving functions) that can be implemented by the first cognitive determination unit 201 are different from those that can be implemented by the second cognitive determination unit 202. While the automatic travelling in a single lane can be implemented by both the first cognitive determination unit 201 and the second cognitive determination unit 202, the automatic lane change, the automatic travelling into a lane-merging section, the automatic travelling into a lane-branched section, and the automatic gate pass can be implemented only by the first cognitive determination unit 201 and cannot be implemented by the second cognitive determination unit 202. It should be noted that the functions that can be implemented by the first cognitive determination unit 201 and the second cognitive determination unit 202 are merely examples, and are not limited thereto.

Figure 16:
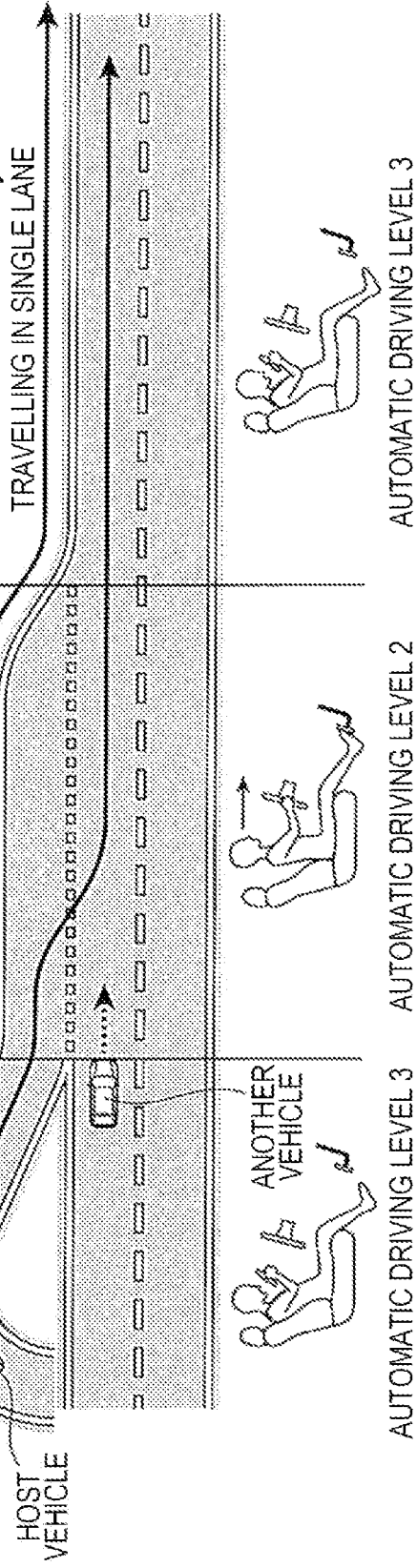
FIG. 16 is a diagram illustrating an operation example of the vehicle control system when applied to the third embodiment.

FIG. 16 illustrates an operation example of the vehicle control system 100 according to the third embodiment when applied.

FIG. 16 shows a scene in which the host vehicle is travelling toward an acceleration section to enter into an expressway. As described in the flowchart illustrated in FIG. 14, the backup availability determination unit 203 determines whether or not backup is available using the second control device 25 when a failure occurs in the first control device 1. Here, the backup availability determination unit 203 determines that travelling in a single lane can be continued (backed up) by the second control device 25 although a failure occurs while executing the function and notifies the driver via the HMI 23 that automatic driving will be system-responsible (for example, automatic driving level 3), and determines that travelling into a lane-merging section other than travelling in a single lane cannot be continued (backed up) by the second control device 25 when a failure occurs while executing the function and notifies the driver via the HMI 23 that automatic driving will be driver-responsible (for example, automatic driving level 2) (in other words, the system-responsible automatic driving will be switched to the driver-responsible automatic driving in the lane-merging section).

According to the vehicle control system 100 in the third embodiment described above, it is determined, when a failure occurs in the first control device 1 while executing a future driving behavior, whether or not the function (in other words, the future driving behavior) can be continued by the second control device 25. When it is determined that the function cannot be continued, the system-responsible automatic driving can be switched to the driver-responsible automatic driving. In particular, in the third embodiment, for travelling in a single lane that can be continued by the second control device 25, the function can be executed in a system-responsible automatic driving mode, and for the other driving behaviors that cannot be continued by the second control device 25, the functions can be executed in a driver-responsible automatic driving mode. Therefore, even if a failure occurs in the first control device 1 during automatic driving for travelling into a lane-merging section, changing a lane, or travelling at an intersection, the driver is not suddenly required to operate the steering wheel from a system-responsible driving state. That is, safety can be ensured at a low cost even when the first control device 1 fails, thereby improving the safety of an automatic driving system (or a driving support system).

Fourth Embodiment

The fourth embodiment is an embodiment of a vehicle control system 100 for continuing a before-failure function when the first control device 1 fails, and particularly, a vehicle control system 100 for continuing a function for automatic travelling in a single lane, automatic lane change, automatic travelling into a lane-merging section, or automatic travelling into a lane-branched section. That is, more continuable functions are added to the fourth embodiment as compared with the third embodiment. In the fourth embodiment, the system configuration diagram and the block diagram of the vehicle control system 100 and the block diagram of the first cognitive determination unit 201 of the first control device 1 are basically the same as those in the first embodiment described with reference to FIGS. 1 to 3. In addition, the block diagram of the second cognitive determination unit 202 of the second control device 25 is basically the same as that of the first cognitive determination unit 201 of the first control device 1 in the first embodiment described with reference to FIG. 3. Therefore, the same parts as those in the first, second, or third embodiment will be denoted by the same reference numerals and the description thereof will be omitted, and the differences will be mainly described below.

Figure 3:
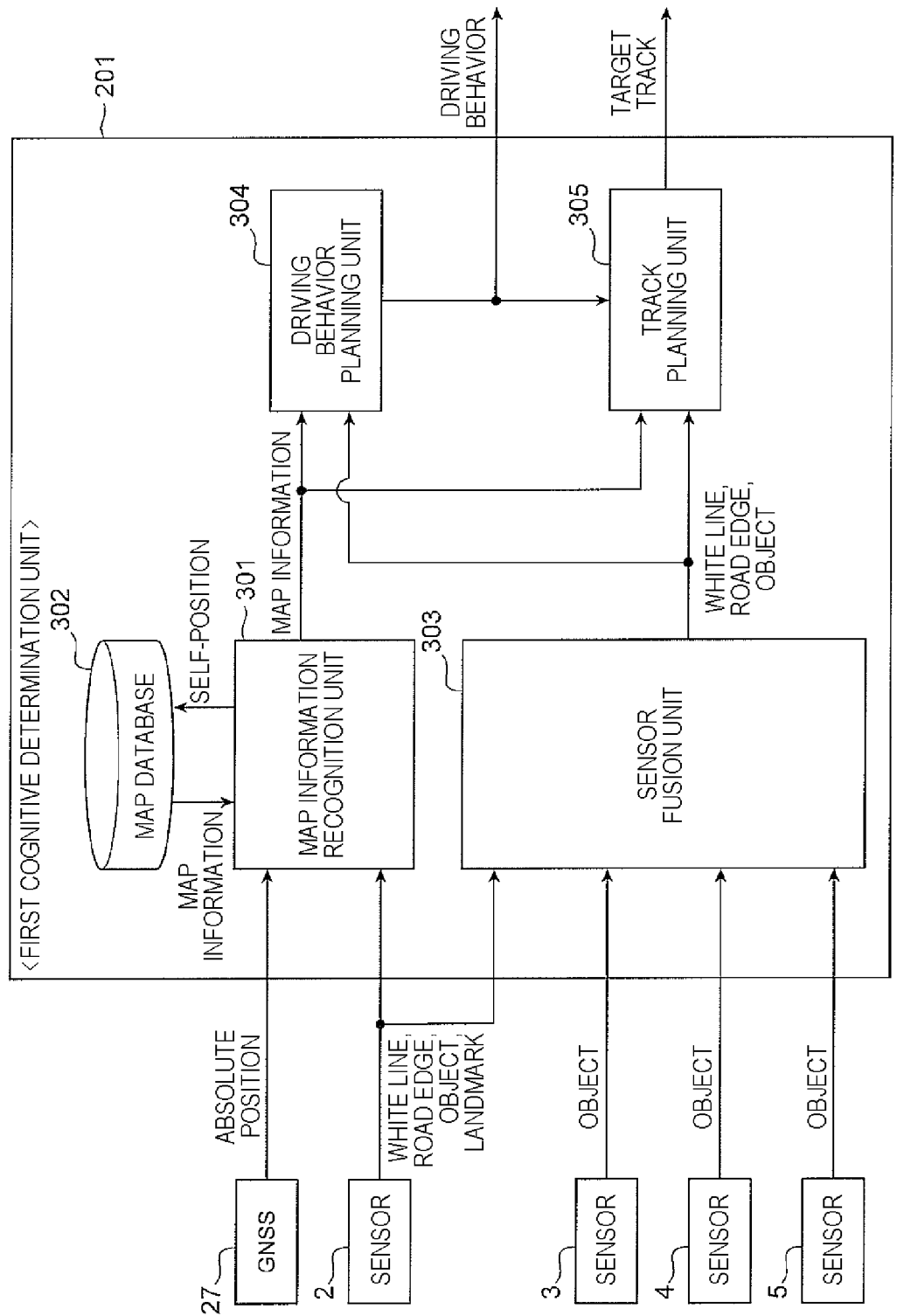
FIG. 3 is a block diagram of a first cognitive determination unit in the first to fourth embodiments or a block diagram of a second cognitive determination unit in the fourth embodiment.

As described above, the second cognitive determination unit 202 of the second control device 25 in this embodiment has the same configuration as the first cognitive determination unit 201 of the first control device 1 illustrated in FIG. 3. However, in this embodiment, the first control device 1 and the second control device 25 have different hardware specifications, although not illustrated, and thus, the respective functions that can be implemented thereby are different from each other.

FIG. 17 shows a backup method of the second control device 25 when the first control device 1 fails. In the fourth embodiment, when a failure occurs in the first control device 1 while the host vehicle travels in a single lane (without/with a pedestrian), changes a lane, travels in a lane-merging section, or travels in a lane-branched section, the before-failure function is continued by (the second cognitive determination unit 202 of) the second control device 25. That is, in the first and second embodiments, the host vehicle is stopped in its lane or on the shoulder, but in the fourth embodiment, like the third embodiment, the before-failure function can be continued, rather than stopping the host vehicle immediately in the event of a failure. That is, the travelling in the lane of the host vehicle, the lane change, the travelling into the lane-merging section, and the travelling into the lane-branched section can be continued by generating a track for travelling in the lane of the host vehicle, a track for travelling into the lane-merging section, a track for changing the lane, and a track for travelling into the lane-branched section, respectively.

It should be noted that backup availability determination by the backup availability determination unit 203 depending on whether to maintain the functions is the same as that in the third embodiment, and thus, the description thereof will be omitted.

FIG. 18 is a table summarizing automatic driving functions that can be implemented by the first cognitive determination unit 201 and the second cognitive determination unit 202. The first cognitive determination unit 201 can implement, for example, automatic travelling in a single lane, brake-based automatic obstacle avoidance with respect to a pedestrian and an obstacle, automatic lane change, automatic travelling into a lane-merging section, automatic travelling into a lane-branched section, travelling at an intersection, and steering-based automatic obstacle avoidance with respect to a pedestrian and an obstacle.

On the other hand, as described above, the second cognitive determination unit 202 can implement travelling in a single lane, brake-based obstacle avoidance with respect to a pedestrian and an obstacle, automatic lane change, automatic travelling into a lane-merging section, and automatic travelling into a lane-branched section. That is, in this embodiment, the functions (automatic driving functions) that can be implemented by the first cognitive determination unit 201 are different from those that can be implemented by the second cognitive determination unit 202. The automatic travelling in a single lane, the brake-based automatic obstacle avoidance with respect to a pedestrian and an obstacle, the automatic lane change, the automatic travelling into a lane-merging section, and the automatic travelling into a lane-branched section can be implemented by both the first cognitive determination unit 201 and the second cognitive determination unit 202, but the travelling at an intersection and the steering-based automatic obstacle avoidance with respect to a pedestrian and an obstacle can be implemented only by the first cognitive determination unit 201 and cannot be implemented by the second cognitive determination unit 202. It should be noted that the functions that can be implemented by the first cognitive determination unit 201 and the second cognitive determination unit 202 are merely examples, and are not limited thereto.

Figure 19:
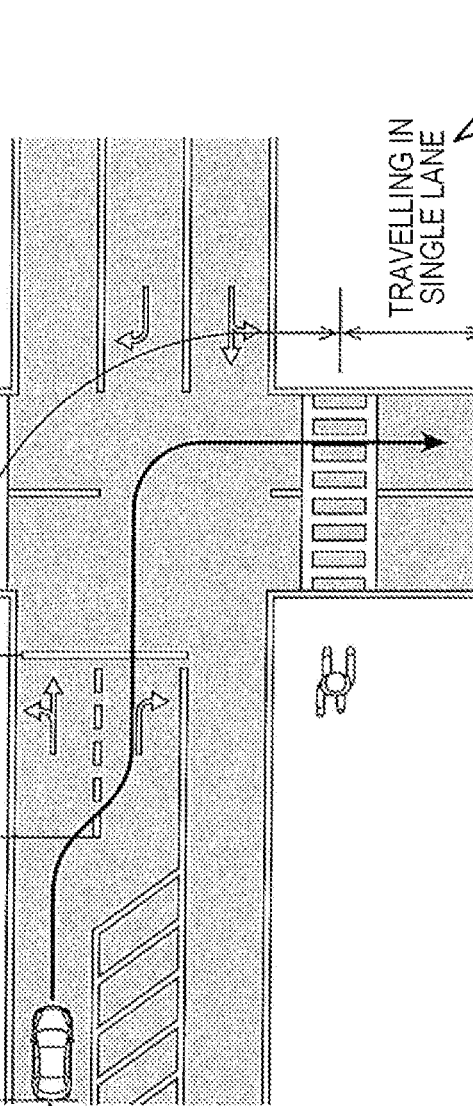
FIG. 19 is a diagram illustrating an operation example of the vehicle control system when applied to the fourth embodiment.

FIG. 19 illustrates an operation example of the vehicle control system 100 according to the fourth embodiment when applied.

FIG. 19 shows a scene in which the host vehicle is travelling toward a right turn at an intersection. As described in the flowchart illustrated in FIG. 14, the backup availability determination unit 203 determines whether or not backup is available using the second control device 25 when a failure occurs in the first control device 1. Here, the backup availability determination unit 203 determines that travelling in a single lane and changing a lane can be continued (backed up) by the second control device 25 although a failure occurs while executing the functions and notifies the driver via the HMI 23 that automatic driving will be system-responsible (for example, automatic driving level 3), and determines that turning right at an intersection cannot be continued (backed up) by the second control device 25 when a failure occurs while executing the function and notifies the driver via the HMI 23 that automatic driving will be driver-responsible (for example, automatic driving level 2) (in other words, the system-responsible automatic driving will be switched to the driver-responsible automatic driving in the lane-merging section).

In the scene shown in FIG. 19, the driver-responsible automatic driving (for example, automatic driving level 2) may be notified to the driver while travelling in the single lane or while changing the lane.

According to the vehicle control system 100 in the fourth embodiment described above, it is determined, when a failure occurs in the first control device 1 while executing a future driving behavior, whether or not the function (in other words, the future driving behavior) can be continued by the second control device 25. When it is determined that the function cannot be continued, the system-responsible automatic driving can be switched to the driver-responsible automatic driving. In particular, in the fourth embodiment, for automatic travelling in a single lane, brake-based automatic obstacle avoidance with respect to a pedestrian and an obstacle, automatic lane change, automatic travelling into a lane-merging section, automatic travelling into a lane-branched section that can be continued by the second control device 25, the functions can be executed in a system-responsible automatic driving mode, and for the other driving behaviors that cannot be continued by the second control device 25, the functions can be executed in a driver-responsible automatic driving mode. Therefore, even if a failure occurs in the first control device 1 during automatic driving for travelling at an intersection and steering-based automatic obstacle avoidance with respect to a pedestrian and an obstacle, the driver is not suddenly required to operate the steering wheel from a system-responsible driving state. That is, safety can be ensured at a low cost even when the first control device 1 fails, thereby improving the safety of an automatic driving system (or a driving support system).

In this embodiment, the above-described functions are examples, but the functions do not need to be limited thereto. This embodiment is valid as long as the second cognitive determination unit 202 can implement fewer functions than the first cognitive determination unit 201.

Although each of the embodiments has been described above, the specific configuration is not limited to each of the above-described embodiments. The present invention covers any modifications and the like in a range without departing from the gist of the invention.

Also, the respective embodiments may be appropriately combined together. Further, with respect to a part of the configuration of each embodiment, it is possible to perform addition of another configuration, deletion, or replacement with another configuration.

Further, each of the above-described configurations, functions, processing units, processing means, and the like may be implemented by hardware, for example, by designing an integrated circuit for a part or all thereof. Further, each of the above-described configurations, functions, and the like may be implemented by software by interpreting and executing a program for implementing each of the functions through a processor. Information such as programs, tables, and files for implementing the respective functions can be stored in a storage device such as a memory, a hard disk, or a solid state drive (SSD), or a recording medium such as an IC card, an SD card, or a DVD.

In addition, control lines and information lines which are considered to be necessary for the explanation are illustrated, however, all the controlling lines and the information lines are not essentially necessary in products. Practically, it may be assumed that almost all components are connected to each other.

REFERENCE SIGNS LIST 1 first control device
2 stereo camera (sensor)
3, 4 laser radar (sensor)
5 millimeter-wave radar (sensor)
6 steering wheel
7 steering torque detection device
8 steering control device
9 motor
10 steering control mechanism (actuator)
12 brake pedal
13 brake control mechanism (actuator)
14 combined sensor
15 brake control device
16FL to 16RR wheel cylinder
17 accelerator pedal
18 stroke sensor
19 throttle control device
20 throttle control mechanism (actuator)
21 steering wheel angle detection device
22FL to 22RR vehicle wheel speed sensor
23 HMI (notification unit)
25 second control device
26 vehicle motion control device
27 GNSS
100 vehicle control system
201 first cognitive determination unit
202 second cognitive determination unit
203 backup availability determination unit
204 vehicle control unit
205 failure determination unit
301 map information recognition unit
302 map database
303 sensor fusion unit
304 driving behavior planning unit
305 track planning unit
401 backup track generation unit
403 sensor fusion unit
405 track planning unit

The invention claimed is:

1. A vehicle control system including:
a first control device including at least a first memory, a first input/output device, and a first processor that implements at least two automatic driving-related functions;
a second control device including at least a second memory, a second input/output device, and a second processor that implements fewer automatic driving-related functions than the first control device; and
a vehicle control unit communicatively coupled to the first control device and the second control device, the vehicle control unit automatically controls a driving state of a host vehicle based on a function planned by the first or second control device
the first control device plans a target track based on the at least two automatic driving-related functions, and sends the target track to the vehicle control unit,
the second control device generates a backup track based on the fewer automatic driving-related functions, and sends the target track to the vehicle control unit,
the first control device determines whether or not a course of the host vehicle intersects with a course of an other vehicle during the at least two automatic driving-related functions, and
on a condition that the course of the host vehicle intersects with the course of the other vehicle and the backup track including at least one of stopping or decelerating is not available, a driver of the host vehicle receives a notification in advance of switching that automated driving by the vehicle control unit will end, and the vehicle control unit switches the host vehicle from the automated driving to automatic driving with driver responsibility for a predetermined time or a predetermined distance, and once the predetermined time elapses or the predetermined distance is traveled, the driver is notified that the automated driving will resume and the vehicle control unit switches the host vehicle from the automatic driving with driver responsibility to the automated driving, and on a condition that the course of the host vehicle does not intersect with the course of the other vehicle, the driver is notified that the backup track is available and the vehicle control unit maintains the automated driving, and wherein the driving state includes at least one of a steering direction, a braking amount, or a throttle amount of the host vehicle.

2. The vehicle control system according to claim 1, wherein the notification in advance of the switching is performed before the host vehicle reaches a section determined by the first control device that the backup track is not available.

3. The vehicle control system according to claim 1, wherein the notification in advance of the switching is performed together with at least one of a backup-available section and a backup-unavailable section.

4. The vehicle control system according to claim 1, wherein the second control device generates a track for stopping along a lane in which the host vehicle is travelling, and the first control device determines that the backup track is not available when the host vehicle intersects with the other vehicle during a driving behavior.

5. A vehicle control system including:
a first control device including at least a first memory, a first input/output device, and a first processor that implements at least two automatic driving-related functions;
a second control device including at least a second memory, a second input/output device, and a second processor that implements fewer automatic driving-related functions than the first control device; and
a vehicle control unit communicatively coupled to the first control device and the second control device, the vehicle control unit automatically controls a driving state of a host vehicle based on a function planned by the first or second control device,
the first control device plans a target track based on the at least two automatic driving-related functions, and sends the target track to the vehicle control unit,
the second control device generates a track for stopping on a shoulder next to a lane in which the host vehicle is travelling and generates a backup track based on the fewer automatic driving-related functions, and sends the target track to the vehicle control unit,
the first control device determines whether or not that the backup track is available when there is no space on the shoulder for the host vehicle to stop during a driving behavior, and
on a condition that the shoulder is not available for stopping, a driver of the host vehicle receives a notification in advance of switching that automated driving by the vehicle control unit will end, and the vehicle control unit switches the host vehicle from the automated driving to automatic driving with driver responsibility for a predetermined time or a predetermined distance, and once the predetermined time elapses or the predetermined distance is traveled, the driver is notified that the automated driving will resume and the vehicle control unit switches the host vehicle from the automatic driving with driver responsibility to the automated driving, and on a condition that the shoulder is available for stopping, the driver is notified that the backup track is available and the vehicle control unit maintains the automated driving, and wherein the driving state includes at least one of a steering direction, a braking amount, or a throttle amount of the host vehicle.

6. The vehicle control system according to claim 5, wherein the notification in advance of the switching is performed before the host vehicle reaches a section determined by the first control device that the backup track is not available.

7. The vehicle control system according to claim 5, wherein the notification in advance of the switching is performed together with at least one of a backup-available section and a backup-unavailable section.

8. A vehicle control system including:
a first control device including at least a first memory, a first input/output device, and a first processor that implements at least two automatic driving-related functions;
a second control device including at least a second memory, a second input/output device, and a second processor that implements fewer automatic driving-related functions than the first control device; and
a vehicle control unit communicatively coupled to the first control device and the second control device, the vehicle control unit automatically controls a driving state of a host vehicle based on a function planned by the first or second control device;
the first control device plans a target track based on the at least two automatic driving-related functions, and sends the target track to the vehicle control unit,
the second control device generates a backup track based on the fewer automatic driving-related functions, and sends the target track to the vehicle control unit,
the first control device determines, based on a future function of the fewer automatic driving-related functions that can be implemented by the second control device, whether or not the backup track is available when the future function is a function that can be implemented by the first control device but cannot be implemented by the second control device, and
on a condition that the backup track is not available, a driver of the host vehicle receives a notification in advance of switching that automated driving by the vehicle control unit will end, and the vehicle control unit switches the host vehicle from the automated driving to automatic driving with driver responsibility for a predetermined time or a predetermined distance, and once the predetermined time elapses or the predetermined distance is traveled, the driver is notified that the automated driving will resume and the vehicle control unit switches the host vehicle from the automatic driving with driver responsibility to the automated driving, and
on a condition that the backup track is available, the driver is notified that the backup track is available and the vehicle control unit maintains the automated driving, and wherein the driving state includes at least one of a steering direction, a braking amount, or a throttle amount of the host vehicle.

9. The vehicle control system according to claim 8, wherein the second control device generates a track for travelling in a lane of the host vehicle, and the first control device determines that the backup track is not available during a driving behavior other than travelling in a single lane.

10. The vehicle control system according to claim 8, wherein the second control device generates a track for travelling in a lane of the host vehicle, a track for travelling into a lane-merging section, a track for changing a lane, and a track for travelling into a lane-branched section, and the first control device determines that the backup track is not available during a driving behavior other than travelling in a single lane, travelling into a lane-merging section, changing a lane, and travelling into a lane-branched section.

11. The vehicle control system according to claim 8, wherein the notification in advance of the switching is performed before the host vehicle reaches a section determined by the first control device that the backup track is not available.

12. The vehicle control system according to claim 8, wherein the notification in advance of the switching is performed together with at least one of a backup-available section and a backup-unavailable section.

* * * * *